Aug. 7, 1962 R. C. FERRAR ET AL 3,048,840

COMMUNICATION SYSTEM

Filed March 6, 1956 4 Sheets-Sheet 1

INVENTORS
ROBERT C. FERRAR
HEYWARD A. FRENCH
BY Alfred C. Hill
AGENT

INVENTORS
ROBERT C. FERRAR
HEYWARD A. FRENCH
BY
Alfred C. Hill
AGENT

INVENTORS
ROBERT C. FERRAR
HEYWARD A. FRENCH
BY Alfred C. Hill
AGENT

INVENTORS
ROBERT C. FERRAR
HEYWARD A. FRENCH
BY Alfred C. Hill
AGENT

United States Patent Office 3,048,840

Patented Aug. 7, 1962

3,048,840

COMMUNICATION SYSTEM

Robert C. Ferrar, Plainfield, and Heyward A. French, Ridgewood, N.J., assignors to International Telephone and Telegraph Corporation, Nutley, N.J., a corporation of Maryland Filed Mar. 6, 1956, Ser. No. 569,806

19 Claims. (Cl. 343—100)

This invention relates to communication systems and more particularly to a radio communication system having a novel arrangement for reliable and uninterrupted communication.

One of the major requirements for radio communication systems is reliability, that is, communication must be accomplished without loss of the transmission path through failure of equipment. This reliability is provided by employing identical auxiliary equipment for each set of equipment. In the past, these auxiliary equipments have been operated at filament "warmup" and/or power "warmup" conditions. There further has been required the use of automatic switchover equipment in conjunction with the two complete sets of radio equipment, one of the radio equipments being in full-time operation and the other in "standby." Failure of the full-time operating equipment activates the automatic switchover equipment to transfer the communication path to the "standby" equipment. The switchover systems are inherently complex and, as a consequence, are sources of failure themselves. A further objection to the switchover systems is the time interval required to accomplish the switching operation. This switching interval causes an interruption in the communication carried on over the transmission path.

Therefore, an object of this invention is to provide reliable and uninterrupted communication service without employing the complex switchover equipment of the piror art.

Another object of this invention is to provide an arrangement to accomplish the above object without increasing the radio frequency spectrum employed.

Still another object of this invention is to provide a communication system including two complete sets of communication equipments to define two communication paths, both sets of equipment operating at full time and connected in parallel to cooperate in accomplishing the above objects.

It might be thought that parallel, full-time operation of both equipments is rather extravagant of tube life. However, this is not the case when certain communication requirements are considered. For instance, the requirement of a switching time interval of not more than 15 seconds per station makes it mandatory to operate the "standby" equipment in a "warmup" condition. This might be accomplished by operating "standby" equipment with filament power on. However, it is known that, due to the development of cathode interface, operation in this manner will result in considerably shortened tube life. It, therefore, becomes necessary to operate "standby" with filament and plate power applied. Thus, it follows that, since full-time operation of both equipments is required with a "switchover-standby" system, parallel operation is no more extravagant of tube life than the prior art switchover arrangements.

A further object of this invention is a communication system employing two sets of equipment for each direction of communication, both sets of equipment operating full time and connected in parallel to afford continuous, uninterrupted service with no deterioration in the communication quality while at the same time eliminating the need for the switchover equipment of the prior art. The continuous and uninterrupted service is achieved with the system of this invention even in event of failure of one of the units in the parallel signal channels since there is no switching interval upon failure as encountered in a conventional switchover arrangement.

Still a further object of this invention is to provide an increase in the signal-to-noise ratio with respect to the signal-to-noise ratio present in the single channel operation of the prior art by the parallel operation of two independent signal channels each including a transmitter and a receiver independently providing a signal-to-noise ratio equal to the prior art arrangement. This increase in signal-to-noise effect derives from the direct arithmetic addition of the synchronous output signal components compared to the root mean square addition of the nonsynchronous, random noise components. Thus, with this signal-to-noise ratio, a failure in one of the parallel signal channels will result only in a deterioration of communication quality to a value equal to that realized in the prior art arrangements.

A feature of this invention is the provision of a communication system providing reliable and uninterrupted service comprising a pair of full-time operating transmitters and a pair of full-time operating receivers disposed to be in direct communication with respective ones of said transmitters to provide a pair of parallel signal channels. A common signal is coupled to each of the transmitters, and the outputs of the receivers are coupled to a common output means. The transmitter and receiver of each channel are capable of independent transmission of a given quality, and the parallel operation thereof provides signal transmission of a given gain over said given quality.

Another feature of this invention is the utilization of cross-polarized antennas to separate the radio frequency paths of the two transmitters and two receivers and hence the two independent parallel signal channels for simultaneous transmission of the same information thereover on the same frequency.

Still another feature of this invention is the provision of means to continuously monitor the condition of both the receiver and transmitter of each of the parallel signal channels. Upon failure of any component in one of the parallel signal channels, the monitoring circuits of the transmitters and receivers will activate an alarm circuit. If a receiver fails, the monitoring circuit further disables the troublesome receiver to prevent the addition of noise from that receiver to the common signal output.

Other important features of this invention include the following items. (1) Two-way communication is obtained by employing two systems as described hereinabove with respect to one-way communication and duplexing the transmitters and receivers of this double equipment on each polarization and carrying on communication in one direction at a first frequency and communication in the opposite direction at a second frequency. (2) Space diversity reception is achieved with the communication system of this invention by the addition thereto of only one antenna per two-way hop rather than two additional antennas conventionally used. (3) The radio frequency output of the transmitter of each channel is rendered exactly the same by an interconnection between the transmitters of the parallel signal channels. (4) The gain of the individual receivers of the parallel signal channels is rendered substantially the same by an interconnection of the automatic gain control circuits of the receivers of the parallel signal channels.

The above-mentioned and other features and objects of this invention will become more apparent by reference to the following description taken in conjunction with the accompanying drawings, in which.

Figures 1, 3:
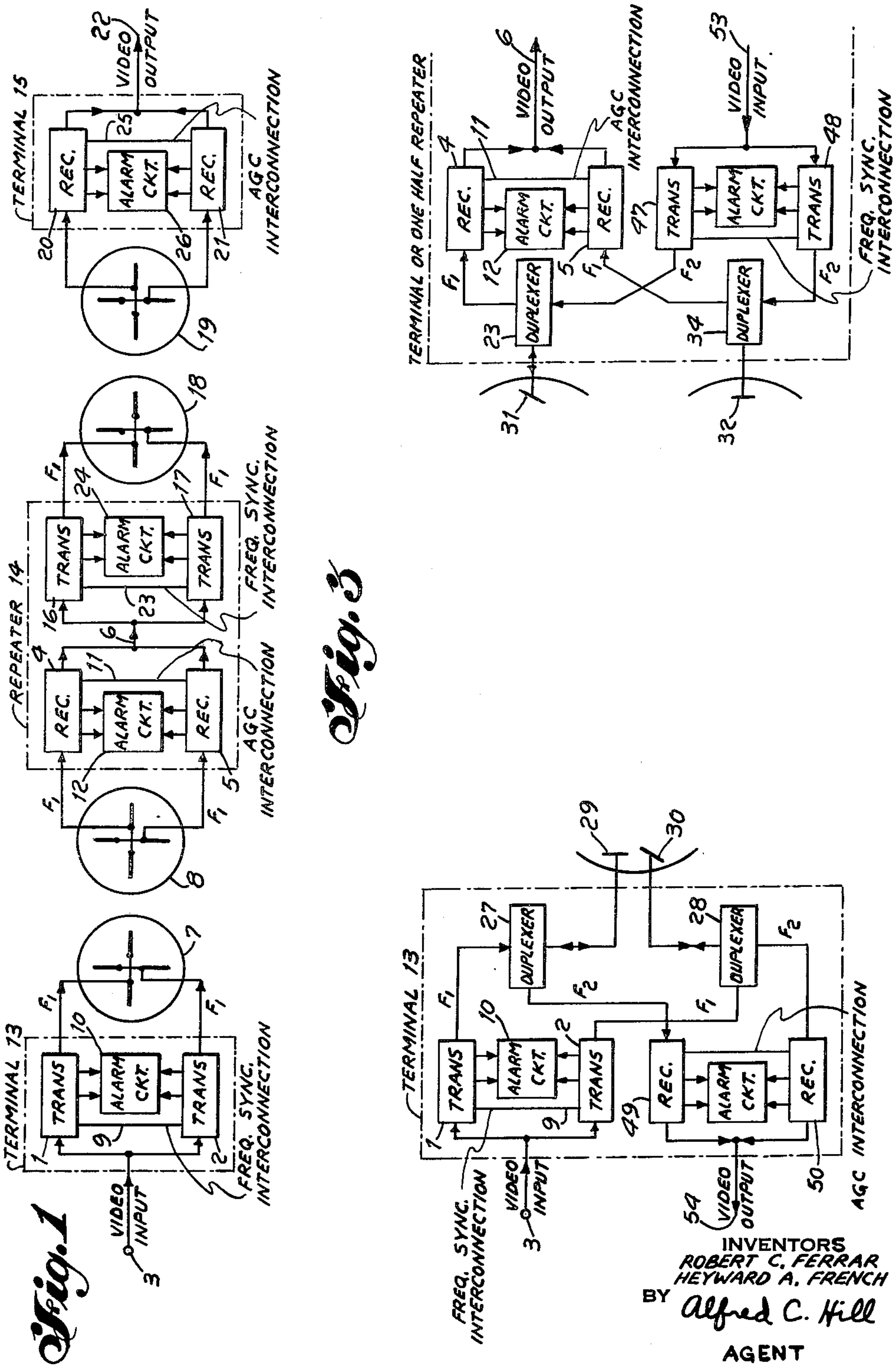
FIG. 1 is a schematic diagram in block form of the communication system of this invention.
FIG. 3 is a schematic diagram in block form of the communication system of FIG. 1 adapted for two-way space diversity operation.

Referring to FIG. 1, the basic system of this invention is shown to comprise a pair of full-time operating transmitters 1 and 2 having a common video input means 3 and a pair of full-time operating receivers 4 and 5 disposed to be in direct communication with respective ones of transmitters 1 and 2 to provide a pair of independent, parallel signal channels which are used for transmitting the same information. The outputs of receivers 4 and 5 are coupled to a common output means 6. Transmitters 1 and 2 and receivers 4 and 5 operate full time on the same frequency to carry the communication simultaneously over parallel paths which are separated on a polarization basis by the cross-polarized antennas 7 and 8. It is to be understood that cross-polarized antennas are not the only available means to separate the radio frequency channels on a polarization basis. Similar results could be obtained by employing waveguide coupling between the transmitters and receivers having therein launching and receiving elements which are cross polarized.

Each of the transmitters 1 and 2 is interconnected by conductor 9 to render the frequency output of the local oscillators identical, and, hence, the frequency output of transmitters 1 and 2 will be identical. The transmitters further include monitor means to monitor the signal condition and function to initiate an alarm in alarm circuit 10 when the signal condition falls below a predetermined desirable condition. Alarm circuit 10 has two alarms, a secondary alarm when either one of the transmitters 1 and 2 fails to emit a signal and a primary alarm when both transmitters 1 and 2 fail to emit a signal. A primary alarm may be interpreted to mean a failure of input video signal rather than transmitter breakdown.

Receivers 4 and 5 have their AGC (automatic gain control) control voltage circuits interconnected by conductor 11 in a manner to tie the two AGC control voltages together for substantially identical control of the gain of receivers 4 and 5 and thereby supply substantially identical signal levers to the common output means 6. As in the case of transmitters 1 and 2, receivers 4 and 5 employ monitor means to monitor the condition of the signal in each of the receivers. If the signal condition of either one of the receivers 4 and 5 falls below a predetermined signal condition, a secondary alarm will be initiated in alarm circuit 12, and if the signals of both receivers 4 and 5 fall below the predetermined signal condition, a primary alarm will be initiated in alarm circuit 12.

Employing the basic circuit hereinabove described, it is possible to build a one-way communication system substantially as illustrated in FIG. 1 including a terminal 13, one or more repeaters substantially identical to repeater 14, and a receiving terminal 15. As illustrated, terminal 13 would include transmitters 1 and 2 and their common circuit connections 9 and 10 as well as their cross-polarized antenna 7. Repeater 14 would include the receivers 4 and 5, the cross-polarized antenna 8, and their common circuit connections 11 and 12. The common output means 6 would then be coupled to another pair of transmitters 16 and 17 for reradiation of the received signal to another repeater or the receiving terminal 15 by means of cross-polarized antenna 18. The terminal 15 would receive the reradiated signal on the respective parallel signal channels including cross-polarized antenna 19 and receivers 20 and 21, whose output signals are coupled to a common output means 22. As in the case of the basic system, transmitters 16 and 17 are interconnected by conductor 23 to render their output signals at the same frequency and would further be interconnected to a common alarm circuit which is energized from the monitoring means in each of the transmitters. The receivers 20 and 21 would have their AGC circuits interconnected by conductor 25 and would have in common to the monitoring circuits of these receivers the alarm circuit 26.

Under conditions of reception of equal signals on both horizontal and vertical polarization planes, the signal-to-noise ratio in the receiver common video output, as indicated at 6 or 22 in FIG. 1, will be as much as 3 db greater than the signal-to-noise ratio of either receiver operating alone with the same conditions of input signal and output load impedance. This is derived from the fact that the signal components in the output load, being synchronous, will add algebraically, while the noise components from the two receivers will add on a power basis. Therefore, the total combined signal power will be 6 db greater and the combined noise power will be only 3 db greater than either receiver alone. The net signal-to-noise ratio for the parallel operation described will be 3 db greater than a single receiver. In the event of a transmitter failure, which removes transmission on one of the polarizations, or a receiver failure, which will result in one receiver being disconnected from the output, the signal-to-noise ratio of the combined output will drop 3 db. The resultant absolute value of signal-to-noise ratio, however, will be the same as for a single receiver operating into the same load impedance as the present parallel communication system.

Figure 2:
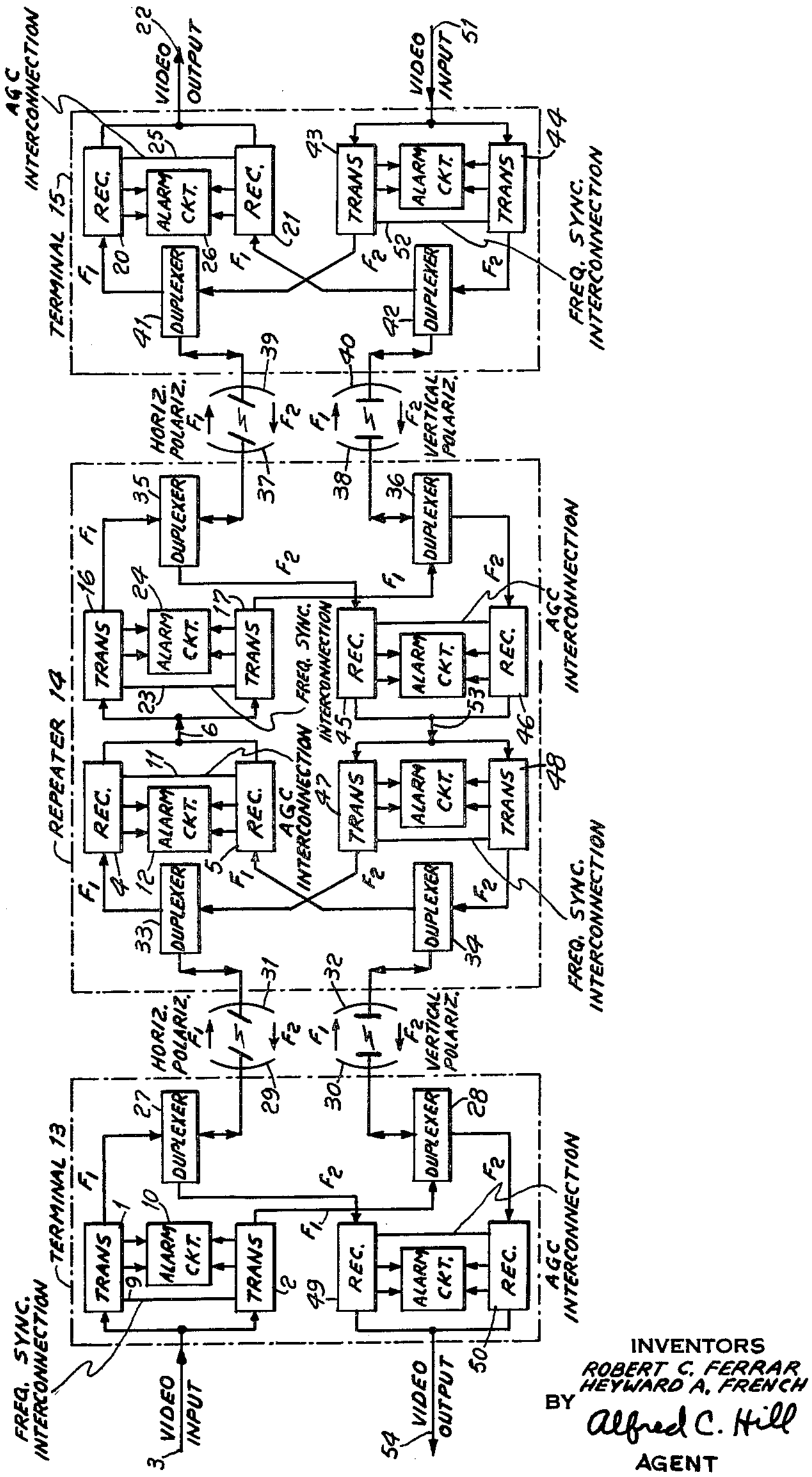
FIG. 2 is a schematic diagram in block form of the communication system of FIG. 1 adapted for two-way operation.

Referring to FIG. 2, there is illustrated therein a parallel communication system as illustrated and described in connection with FIG. 1 adapted for two-way communication. Identical reference characters will be employed in FIG. 2 for those components which correspond to the components of FIG. 1. Examining the transmission path from terminal 13 to terminal 15, it is seen that the equipments involved in the transmission circuit are transmitters 1 and 2, duplexers 27 and 28, cross-polarized antennas 29 and 30, cross-polarized antennas 31 and 32, duplexers 33 and 34, receivers 4 and 5, common output means 6, transmitters 16 and 17, duplexers 35 and 36, cross-polarized antennas 37 and 38, cross-polarized antennas 39 and 40, duplexers 41 and 42, receivers 20 and 21, and common video output 22. The transmitters at terminal 13 are fed with the same video signal from terminal 3 and are interconnected by conductor 9 in a manner which will result in the radio frequency output frequencies of transmitters 1 and 2 being identical, as represented by $F_1$. The mechanism by which this is accomplished will be explained in more detail with respect to FIG. 4. The radio frequency outputs of transmitters 1 and 2 are fed through duplexer 27 and duplexer 28, respectively, and, hence, to the two antennas 29 and 30, transmitter 1 to the horizontally polarized antenna 29 and transmitter 2 to the vertically polarized antenna 30. The received signals of each polarization at repeater 14 are fed through duplexers 33 and 34 to the receivers, with receiver 4 receiving the signal from transmitter 1 via horizontal polarization propagation and receiver 5 receiving the signal from transmitter 2 via the vertical polarization propagation. The video output signals of the two receivers are connected in parallel and to a common load. In the instance of repeater 14, the common load is transmitters 16 and 17 which couple their identical frequency outputs respectively to duplexer 35 and duplexer 36 for propagation respectively on horizontal and vertical polarization through antennas 37 and 38 to terminal 15. The signals received on each polarization at terminal 15 are coupled respectively to duplexers 41 and 42 and, hence, to receivers 20 and 21 which have their video outputs connected in parallel and to a common output means 22. The above-described transmission paths each operate at a frequency $F_1$ for one-way communication. The return path from terminal 15 to terminal 13 is provided by transmitters 43 and 44, duplexers 41 and 42, cross-polarized antennas 39 and 40, cross-polarized antennas 37 and 38, duplexers 35 and 36, receivers 45 and 46, transmitters 47 and 48, duplexers 33 and 34, cross-polarized antennas 31 and 32, cross-polarized antennas 29 and 30, duplexers 27 and 28, and receivers 49 and 50, respectively. The transmitters 43 and 44 at terminal 15 are fed by the same video signal from input terminal 51 and are interconnected by conductor 52 in a manner which will result in the radio frequency output frequencies of the two receivers being identical at a frequency of $F_2$, separated a predetermined amount from the frequency $F_1$. The radio frequency outputs of both transmitters 43 and 44 are fed through duplexers 41 and 42 to the two antennas 39 and 40, transmitter 43 being coupled to the horizontally polarized antenna 39 and transmitter 44 to the vertically polarized antenna 40. The received signals of each polarization at repeater 14 are fed through the respective duplexers 35 and 36 to the receivers 45 and 46, with receiver 45 receiving signals from transmitter 43 via the horizontally polarized propagation and receiver 46 receiving signals from transmitter 44 via the vertically polarized propagation. The video outputs of receivers 45 and 46 are coupled to a common output means 53 and, hence, to transmitters 47 and 48 whose identical frequency outputs are coupled respectively to duplexers 33 and 34. The outputs of duplexers 33 and 34 are coupled to their associated cross-polarized antennas for transmission to terminal 13. The horizontally polarized signal is coupled through duplexer 27 to receiver 49, and the vertically polarized signal is coupled through duplexer 28 to receiver 50. Receivers 49 and 50 have their video outputs connected to a common output circuit and, hence, to a common load by means of terminal 54.

As described in connection with FIG. 1, each transmitter and receiver includes monitoring circuits, and the paired equipment has their monitoring circuit connected to alarm facilities to indicate: (*a*) failure of an individual unit which is identified as a secondary alarm, or (*b*) simultaneous failure of both operating units to provide an output signal which is interpreted as a failure of input signal to the transmitter or receiver pairs and is identified as a primary alarm. The video output of each receiver in the communication system is interconnected with the alarm facilities so that in the event of failure of a receiver its output will be disconnected from the common load to prevent the defective receiver from adding noise to the traffic circuit.

The communication system as described in connection with FIGS. 1 and 2 contains within itself all the facilities to operate with space diversity, if desired. All that is necessary to obtain space diversity operation is to vertically space the antennas at one end of a communication hop resulting in a bi-directional space diversity system utilizing only three antennas. FIG. 3 illustrates a portion of the communication system of FIG. 2 utilized for space diversity, the components in FIG. 3 being identified by the same reference characters employed in FIG. 2. As is obvious, the transmission path lengths will be different when operating in diversity because of the net difference in the length of the antenna transmission line in the two polarization paths. Therefore, it will be necessary to artifically delay the pulses in the shorter path. A practical means for accomplishing this is a proper length of coaxial cable in the output circuit of the receiver or a delay line inserted in the video circuits of the receiver in the shorter path. The delay lines envisioned are illustrated in FIG. 5 by delay lines 55 and 56 which are adjustable to meet the conditions present for a particular radio hop when operating on space diversity principles.

Figure 4:
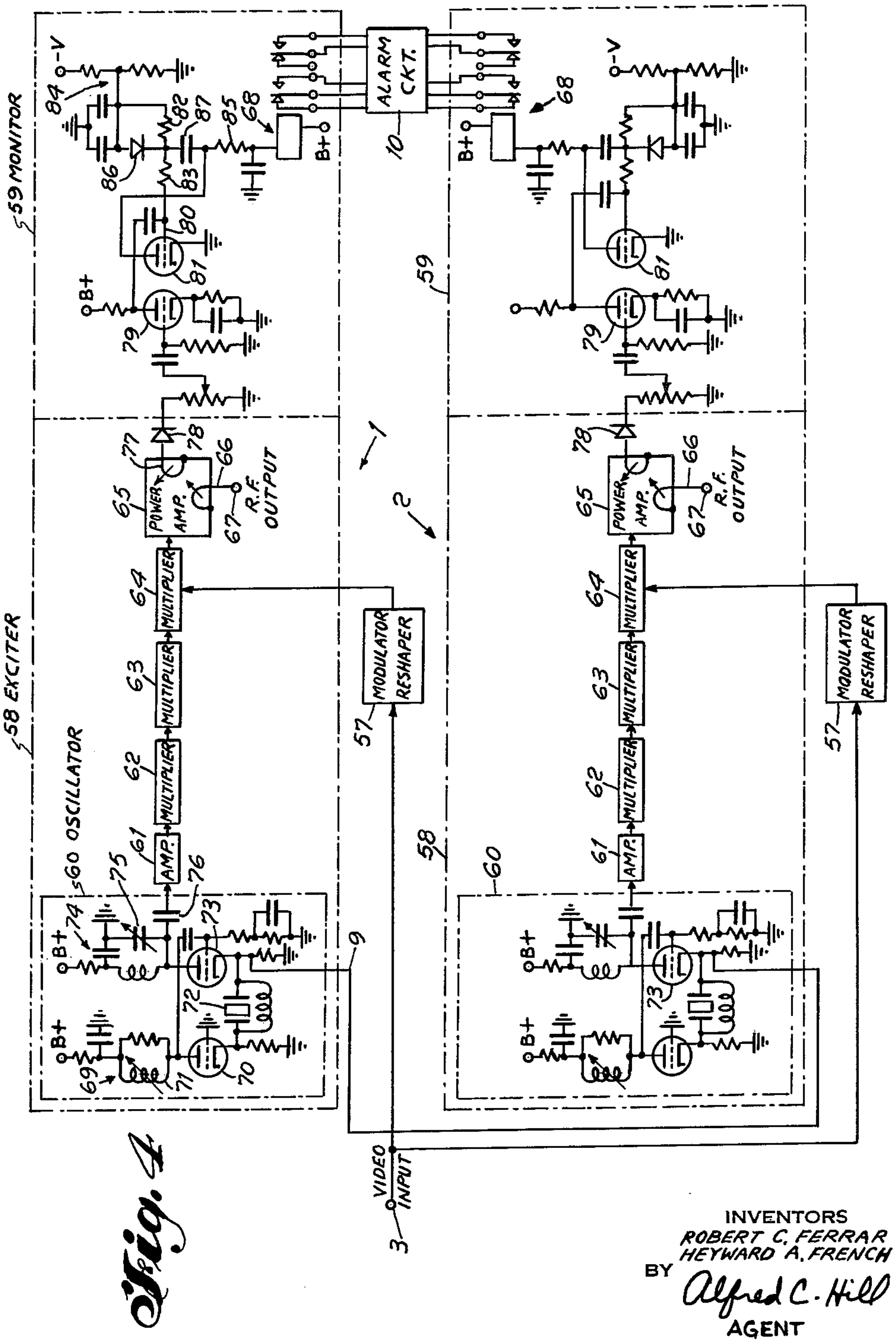
FIG. 4 is a schematic diagram partially in block form of the transmitters employed in the communication system of FIGS. 1, 2 and 3.

Referring to FIG. 4, there is illustrated therein a schematic representation of two transmitters, one associated with each of the signal channels in our parallel channel communication system and the interconnection therebetween. The components of transmitters 1 and 2 are identical, and the description of one transmitter as to the detailed components thereof will suffice for both transmitters illustrated in FIG. 4 and any other parallel connected transmitters that may be encountered in a complete communication system.

Figure 5:
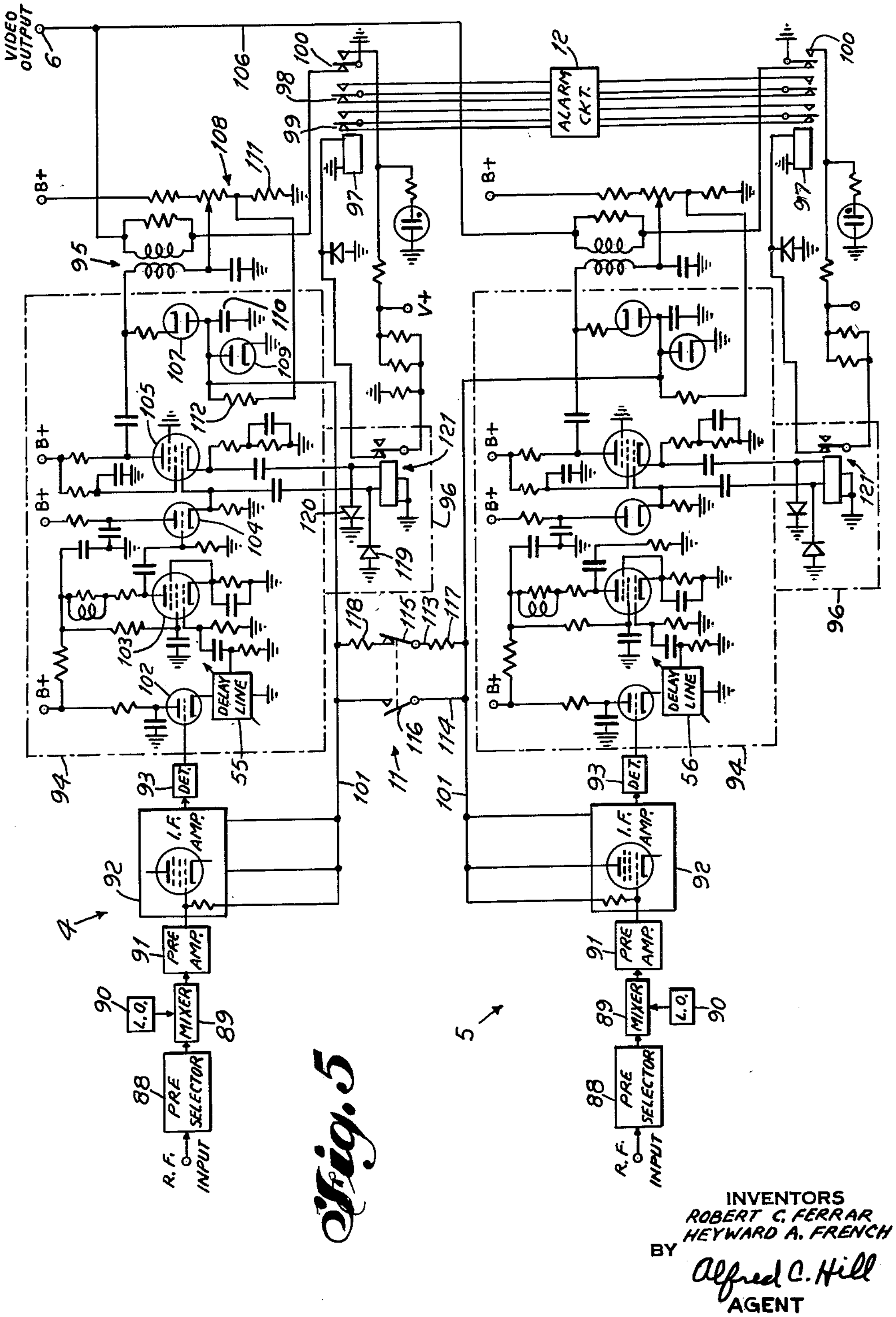
FIG. 5 is a schematic diagram partially in block form of the receivers employed in the communication system of FIGS. 1, 2 and 3.

FIGS. 4 and 5 will be described for operation on a pulse-type video signal, but it is to be remembered that the system will operate on substantially any type video signal provided necessary changes are made in the detailed circuitry employed therein.

Transmitter 1 can be functionally divided into the modulator reshaper section 57, the exciter section 58, and the monitoring means 59. Exciter section 58 consists of an oscillator multiplier 60, at least one stage of amplification as indicated by amplifier 61, at least three stages of multipliers as indicated by multipliers 62, 63 and 64, and a final power amplifier 65. The output of modulator reshaper 57 is coupled to multiplier 64 for keying thereof. The pulsed radio frequency output obtained from multiplier 64 is amplified by power amplifier 65 and coupled therefrom by adjustable coupling loop 66 to provide a radio frequency output at terminal 67.

The pulsed radio frequency output of amplifier 65 is monitored by the monitor 59 which detects the presence of the pulsed radio frequency output and which functions to initiate an alarm in alarm circuit 10 if the radio frequency output is absent. The pulse monitors 59 of both transmitters 1 and 2 are interconnected so that a failure of either unit will produce a secondary alarm in alarm circuit 10 while simultaneous dropout of both monitors 59, indicating a signal failure, will initiate a primary alarm. The interconnection is made through the contacts of the relays illustrated as a portion of the monitors 59 and the alarm circuit 10. Monitoring circuits 59 are used solely for alarm purposes, since no switchover equipment is necessary with this system. It is well to mention at this time that the relays 68 and the contacts associated therewith are shown in the energized position, the normal position assumed by this component when the system is operating in a normal manner, that is, when there is no failure present in the system.

As mentioned hereinabove, identical transmitters 1 and 2 are operated in an arrangement in which it is necessary that the radio frequency outputs of both transmitters be exactly at the same frequency. This is accomplished by interconnecting the oscillators of the two transmitters to synchronize the crystal oscillator frequencies of the two units. However, should one crystal oscillator fail, the remaining crystal oscillator continues to operate independently. In this case, there is no radio frequency output from the transmitter in which the crystal oscillator has failed. In case of any other failure in either transmitter, there would be no radio frequency output from it, but the frequency of the remaining transmitter would still be determined by the synchronized crystal oscillator. Any failure in one transmitter would merely cause loss of its radio frequency output but would have no effect on the remaining unit. This oscillator synchronization is discussed in greater detail in the copending application of W. L. Glomb, filed March 6, 1956, Serial No. 569,839, entitled "Synchronized Oscillators," now Patent No. 2,903,650, assigned to the same assignee as the present application.

The oscillator multiplier 60 consists of a cathode coupled crystal oscillator. The anode load 69 of electron discharge device 70 is tuned by inductance 71 to the fundamental frequency of crystal 72. Electron discharge device 73 and its associated circuit is a true cathode follower for the fundamental frequency, since its anode load 74 is tuned by condenser 75 to the crystal third harmonic. The third harmonic output from the anode of electron discharge device 73 is fed to amplifier 61 through condenser 76. In a successful reduction to practice, crystal oscillator 72 had a fundamental frequency in the range of 47 megacycles to 67 megacycles. Electron discharge device 73 acting as a tripler multiplied this frequency band up to 141 megacycles to 201 megacycles. The frequency in this band passed through amplifier 61 for amplification and, hence, to multiplier 62 which again acted as a tripler to raise the frequency to a band of frequencies consisting of 423 megacycles to 603 megacycles. The output of multiplier 62 was again multiplied by multiplier 63 which functions as a doubler. The output of multiplier 63 was multiplied by multiplier 64 which again doubled the frequency band. The frequency available at the output terminal 69 thus was in the frequency range of 1692 megacycles to 2412 megacycles.

While the multipliers 62, 63 and 64 are illustrated in block diagram in FIG. 4, it is contemplated that this multiplication will take place in a radial transmission line type cavity assembly substantially as illustrated and described in the copending application of H. Havstad, Serial No. 532,720, filed September 6, 1955, entitled "Frequency Multiplier," now Patent No. 2,920,286, having the same assignee as the present application. As described in the copending application, coplanar triodes all operate as grounded grid cathode biased amplifiers or multipliers. Energy transfer from stage to stage is accomplished by coupling the plate current of a given tube and a cathode current of the following tube with the asymmetrical electromagnetic field of a single radial cavity. The tube to tube coupling is a function of the geometry of the tube plus the cavity and is sufficiently broad to cover the operating band.

The connection between the transmitters for frequency synchronization, as described hereinabove, is shown by line 9 connected to the cathode of electron discharge device 73 of transmitter 1 and at the same point in transmitter 2. It is to be understood that line 9 may be a simple conductor or, as is preferred, a coaxial connection which enables the oscillations of one oscillator to synchronize the oscillations of the oscillator of the other transmitter in a manner to present exactly the same frequency at the output of each of the transmitters.

As hereinabove, each transmitter 1 and 2 includes a circuit to provide alarm indications in the event of absence of power output from the transmitter. This has been designated as monitor 59. A portion of the radio frequency power in the power amplifier 65 is coupled by means of adjustable loop 77 to a detector 78. The resultant negative video pulse train is applied to the grid of a triode-type electron discharge device 79 operating as an amplifier. The positive pulse train output of electron discharge device 79 is applied directly to grid 80 of electron discharge device 81. This latter electron discharge device is operated with a grounded cathode. Discharge device 81 is biased to approximately cutoff by application of a negative voltage through resistors 82 and 83 from the resistance divider 84 across a voltage supply —V. The negative pulse train of device 79 developed across the video plate load 85 is applied to the detector 86 through condenser 87. The resultant positive D.C. voltage developed by detector 86 is applied to the grid 80 of device 81 through resistor 83. This type of feedback is regenerative and results in extremely high gain, so that the discharge device 81 tends to act much like a trigger gate. Therefore, it can be seen that normally this section operates under approximately zero bias conditions. This is because the positive D.C. voltage developed at the grid 80, due to detection of the negative pulse train output by detector 86, serves to cancel out the negative fixed bias applied. Under such conditions, the tube current is sufficient to operate the alarm relay 68. Should the radio frequency pulse power output drop below a specified level, the tube current of this section will be so reduced that relay 68 de-energizes. The level at which relay 68 is de-energized is determined by the predetermined setting of the adjustable loop 77. It will be observed that relay 68 is supplied with two sets of double-throw contacts with wiring from each contact to alarm circuit 10 to provide the secondary and primary alarms heretofore mentioned with respect to FIGS. 1 and 2. The interconnection between the transmitters 1 and 2 with respect to their monitoring circuits 59 is made through alarm circuit 10 with respect to their primary alarm circuit.

The circuit described in connection with monitor 59 is described in greater detail in the copending application of H. Havstad, Serial No. 569,845, filed March 6, 1956, entitled "Amplitude Sensitive Circuit," now Patent No. 2,928,002, and having the same assignee as the present application. The circuit described in this copending application provides a stable and reliable electronic relay circuit which will substantially reduce the differential between the input signal amplitude required to produce energizing current in the magnetizing coil of a relay and the maximum input signal amplitude incapable of producing energizing current in the magnetizing coil of this relay. It is the operation described in detail in the Havstad application that permits discharge device 81 to act as a trigger gate to obtain the necessarily rapid change between the energized and de-energized condition of relay 68 to prevent a significant differential between operate and non-operate signal levels into the monitor 59 circuit.

A more detailed illustration of the components of receivers 4 and 5 of FIGS. 1, 2 and 3 is illustrated in FIG. 5. FIG. 5 illustrates a conventional single superheterodyne with those special auxiliary features necessary for the desired system operation.

The output of preselector 88 is mixed in a mixer 89 with a local oscillator signal derived from a klystron oscillator identified as local oscillator 90. The resulting signal is amplified in a preamplifier 91 and an intermediate frequency amplifier 92. The video signal is obtained in the output of detector 93. This video output is amplified in the video amplifier 94 and fed through a video transformer 95 to the output load together with the video output of the parallel receiver 5 identical in nature with the components described in conjunction with receiver 4. The presence of the video signal in the video amplifier is monitored by monitor 96 which, in turn, operates the video output relay 97. In event of a failure causing the video signal to disappear, an alarm is initiated through contacts 98 and/or 99, and the secondary of transformer 95 is disconnected from ground by contact 100 to prevent any output from the defective receiver 4. In case of pulse train failure in both receivers, the alarm contacts are arranged in conjunction with alarm circuit 12 to indicate a signal failure rather than a receiver failure. To insure positive action of the parallel connected receivers as well as the alarm circuit 12 and the monitor circuits 96, the automatic gain control buses 101 are tied together by interconnection means 11.

Video amplifier 94 consists of an amplifier 102 which couples pulse signals from the intermediate frequency detector 93, amplifies them and feeds them through an adjustable video delay line 55 to the output video amplifier comprising electron discharge devices 103, 104 and 105. The output stage 105 will feed signals to the common output 6 through transformer 95 provided contact 100 of relay 97 applies a ground to the secondary of transformer 95. The output of the secondary winding of transformer 95 will be coupled to output terminal 66 and along interconnection 106 which serves as a video interconnection between receivers 4 and 5 when operated in parallel. As pointed out before, the video disconnect relay 97 contains additional contacts for alarm initiation purposes. Relay 97 will operate from a pulse noise squelch circuit which derives its control from the output video stage 105. There is also derived from this last video amplifier the AGC control voltage, both circuits of which will be discussed in more detail hereinbelow.

The adjustable delay line 55 functions to equalize the time delay existing between pulses in the two receivers which will result from the difference in lengths of transmission lines when these two receivers are used in a diversity system.

The AGC control voltage for receiver 4 is obtained by detector 107 which detects a portion of the signal output of the final video amplifier. This diode has applied to it an adjustable positive bias from voltage divider 108 having a value somewhat smaller than the peak pulse amplitude expected at the primary of the output transformer during operation. The variations of the detected voltage of detector 107 are smoothed out by condenser 110 and provide a D.C. voltage having a value proportional to the excess of pulse voltage over the bias voltage applied from voltage divider 108. The D.C. output from the diode will be effectively filtered by condenser 110, but the over-all time constant of the network including the necessary intermediate frequency amplifier grid isolation filters will be short enough to allow the AGC voltage to follow flutter-type fading. The developed AGC voltage will be coupled back along bus 101 to at least one of the stages of intermediate frequency amplifier 92 and in a reduction to practice of this receiver was coupled back to three stages. If the requirement exists, all stages of the intermediate frequency amplifier could be supplied with this AGC control voltage. Since the video signal is not entirely free of noise, there will be a residual bias on rectifier 109 which will interfere with the AGC control voltage. To overcome this residual bias due to noise, a small magnitude of bias voltage is coupled back from resistor 111 through resistor 112 and, hence, to the anode of rectifier 109 to effectively cancel the residual noise bias.

As mentioned hereinabove, the AGC buses 101 are tied together by an interconnection 11. In FIG. 5, interconnection 11 is illustrated as including two conductors 113 and 114 including ganged switches 115 and 116 therein. When switch 115 is closed as illustrated, the resistors 117 and 118 act as voltage dividers so that only a certain portion of the AGC control voltage is coupled between the two parallel operated receivers. This supplies a loosely tied AGC bus so that both receivers will remain operative for small fluctuations in signal level present in one propagation path relative to the other but will produce alarm signals for large signal level differences. However, for diversity operation the AGC control voltages must be tied together as tight as possible so that the two receivers, operating in diversity, will select the better signal. This is accomplished by throwing the ganging switches into their other position thereby closing switch 116 which puts into operation connection 114. Connection 114 employs no voltage dividing resistors.

The pulse noise squelch circuit or monitor 96 operates the video disconnect relay and alarm facilities. It is required that the receiver, including intermediate frequency and video amplifiers, have sufficient gain that the performance will be noise limited. This means that the output voltage shall be more or less constant whether the input intermediate frequency signal is composed of noise or pulse. With this type of operation, it is necessary that the monitor circuit be capable of determining when a marginal pulse signal-to-noise ratio exists and disconnects the video output of the receiver from the output line 6 when the ratio of peak pulse to peak noise becomes less than approximately 3 to 1.

Monitor circuit 96 takes advantage of the fact that the pulse at the output is always positive and has an average value of not more than 10 percent of the peak to peak value of the pulse signals. The noise signal, however, will always be symmetrical with an average value of zero. Therefore, monitor 96 measures the negative excursions of the output voltage and compares it to the positive excursions of the output voltage due to pulse signals. It is possible to cause the alarm circuit to operate at any desired value of ratio of peak pulse to peak noise within practical design limitations. The monitor circuit 96 accomplishes this by taking a sample of the receiver output derived from a small unbypassed portion of the total cathode resistance in the output video amplifier 105. The diode 119 is so arranged in a circuit as to develop a negative D.C. voltage proportional to the positive pulse excursion of the ouput signal. Diode 120 coupled to the grid of stage 105 is so arranged as to develop a negative voltage proportional to the negative excusion of noise at the output signal. A polarity sensitive relay 121 is connected between the two diodes 119 and 120 in such a manner as to have the differential output of these diodes applied to its coil. It can be seen that in the presence of pulse and in the absence of noise the relay will be held closed by the voltage developed by diode 119. If diode 120 should also develop an output voltage, as in the case of noise present in the output circuit, this voltage will be of the proper polarity, when applied to the relay, to reduce the net operating voltage across the relay coil and will cause the relay to open if the noise exceeds a predetermined amount. In the absence of output from both diodes, such as in the case where neither pulse nor noise is present in the receiver output, the relay receives no voltage and remains open. It is obvious that diode 119 will develop a voltage in the presence of either noise or pulse signals, but that diode 120 cannot develop a voltage due to pulse. The contact of this sensitive relay will, in turn, operate relay 97 which will have the required contacts as illustrated for alarm initiation in alarm circuit 12 and video disconnect purposes as supplied by contact 100 of relay 97. The copending application of W. L. Glomb, Serial No. 569,779, filed March 6, 1956, entitled "Detector Circuit," and now Patent Number 2,996,613, issued August 15, 1961, having the same assignee as the present application, describes in detail the operation and theory of operation of the pulse monitor 96.

There are certain disadvantages to the system hereindescribed, some of which are two radio frequency transmission lines per equipment are needed, one for each polarization; two diplexers per equipment are needed, one for two-way operation on each polarization. If desired to operate without diplexers two antennas per direction are required, e.g., four antennas for two-way west facing or east facing terminal or half repeater. While this system has certain disadvantages enumerated above, these disadvantages are offset by the advantages afforded by this system as enumerated hereinbelow.

(1) Increased reliability in that both "operating" and "standby" are continuously monitored for condition of operation. A failure cannot occur without initiation of an alarm, so that the failure is recognized and repairs can be made as soon as possible.

(2) A failure in one of the units will not interrupt traffic. No traffic time is lost as a result of switching to "standby."

(3) Elimination of all switchover circuits including a number of circuit relays, timers and two and possibly four antenna switches.

(4) Where the need for space diversity exists, the system can be operated in such an arrangement without the addition of appliqué units. When separate antennas are used for each polarization, a physical relocation on the tower of the antennas at one or both stations of a hop is all that is required. When dual polarization antennas are used, space diversity is accomplished by the use of only three antennas per hop rather than the four conventionally used.

(5) Permits the use of frequency diversity where such need exists by frequency separation of the two paths. Within the band 1700–2400 megacycles, a separation of 650 megacycles is practical. This is adequate for effective frequency diversity operation with reflection and refraction interference path differences of 0.38 foot or greater. Such operation will protect against fades of the signal interference type in the majority of practical link installations and for most of the adverse propagation conditions which might be experienced.

(6) Each equipment can be operated to carry two traffic circuits, two pulse trains, upon elimination of "standby" and the use of an additional pair of carrier frequencies.

(7) Parallel full-time operation of the equipments results in economical use of tube life. When switching interval restrictions placed on a system are considered, it becomes apparent that full-time operation of "operating" and "standby" is mandatory. Parallel full-time operation makes full use of the simultaneous full-time operating equipments.

While we have described above the principles of our invention in connection with specific apparatus, it is to be clearly understood that this description is made only by way of example and not as a limitation to the scope of our invention as set forth in the objects thereof and in the accompanying claims.

We claim:

1. A communication system providing reliable and uninterrupted service between first and second terminals comprising, at said first terminal, a first pair of full-time operating transmitters simultaneously transmitting the same intelligence at a first carrier frequency, a common input means for said first pair of transmitters, first and second duplexer means, means coupling the output of one of the transmitters of said first pair to said first duplexer means, and means coupling the output of the other of the transmitters of said first pair to said second duplexer means; at said second terminal, third and fourth duplexer means, a first pair of full-time operating receivers each being responsive to said first carrier frequency, means coupling the ouput of said third duplexer means to one of said first pair of receivers, means coupling the output of said fourth duplexer means to the other of said first pair of receivers, a common output means for said first pair of receivers, a second pair of full-time operating transmitters simultaneously transmitting identical intelligence at a second carrier frequency, a common input means for said second pair of transmitters, means coupling the output of one of the transmitters of said second pair to said third duplexer means, and means coupling the output of the other of the transmitters of said second pair to said fourth duplexer means; at said first terminal, a second pair of full-time operating receivers each being responsive to said second carrier frequency, means coupling the output of said first duplexer means to one of said second pair of receivers, means coupling the output of said second duplexer means to the other of said second pair of receivers, and common output means for said second pair of receivers, means to establish a signal wave path between said first and third duplexer means and means to establish a signal path between said second and fourth duplexer means to provide a pair of independent, parallel signal wave paths for each direction of communication, the transmitters and receivers associated with each signal wave path being capable of independent signal transmission of a given quality and the parallel operation thereof provides signal transmission of a given gain over said given quality.

2. A communication system providing reliable and uninterrupted service between first and second terminals comprising, at said first terminal, a first pair of full-time operating transmitters simultaneously transmitting the same intelligence at a first carrier frequency, a common input means for each of said first pair of transmitters, a first and second duplexer means, means coupling the output of one of the transmitters of said first pair of said first duplexer means, and means coupling the output of the other of the transmitters of said first pair to said second duplexer means; at said second terminal, third and fourth duplexer means to receive propagation energy from a respective one of said first and second duplexer means, a first pair of full-time operating receivers each being responsive to said first carrier frequency, means coupling the output of said third duplexer means to one of said first pair of receivers, means coupling the output of said fourth duplexer means to the other of said first pair of receivers, a common output means for each of said first pair of receivers, a second pair of full-time operating transmitters simultaneously transmitting identical intelligence at a second carrier frequency, a common input means for said second pair of transmitters, means coupling the output of one of the transmitters of said second pair to said third duplexer means, and means coupling the output of the other of the transmitters of said second pair to said fourth duplexer means; a horizontally polarized antenna coupled to each of said first and third duplexer means to transmit and receive horizontally polarized propagation energy, a vertically polarized antenna coupled to each of said second and fourth duplexer means to transmit and receive vertically polarized propagation energy; at said first terminal, a second pair of full-time operating receivers each being responsive to said second carrier frequency, means coupling the output of said first duplexer means to one of said second pair of receivers, means coupling the output of said second duplexer means to the other of said second pair of receivers, and common output means for said second pair of receivers, said horizontally polarized antennas, said vertically polarized antennas and said duplexer means defining a pair of independent, parallel signal channels for each direction of communication cooperating to provide reliable and uninterrupted service in event of failure in one of said signal channels.

3. A space diversity communication system providing reliable and uninterrupted service between first and second terminals comprising, at said first terminal, a first pair of full-time operating transmitters simultaneously transmitting the same intelligence at a first carrier frequency, a common input means for each of said first pair of transmitters, a first and second duplexer means, means coupling the output of one of the transmitters of said first pair to said first duplexer means, and means coupling the output of the other of the transmitters of said first pair to said second duplexer means; at said second terminal third and fourth duplexer means to receive propagation energy from a respective one of said first and second duplexer means, a first pair of full-time operating receivers each being responsive to said first carrier frequency, means coupling the output of said third duplexer means to one of said first pair of receivers, means coupling the output of said fourth duplexer means to the other of said first pair of receivers, a common output means for each of said first pair of receivers, a second pair of full-time operating transmitters simultaneously transmitting identical intelligence at a second carrier frequency, a common input means for said second pair of transmitters, means coupling the output of one of the transmitters of said second pair to said third duplexer means, and means coupling the output of the other of the transmitters of said second pair to said fourth duplexer means; a horizontally polarized antenna coupled to each of said first and third duplexer means to transmit and receive horizontally polarized propagation energy, a vertically polarized antenna coupled to each of said second and fourth duplexer means to transmit and receive vertically polarized propagation energy; at said first terminal, a second pair of full-time operating receivers each being responsive to said second carrier frequency, means coupling the output of said first duplexer means to one of said second pair of receivers, means coupling the output of said second duplexer means to the other of said second pair of receivers, and common output means for said second pair of receivers, said horizontally polarized antennas, said vertically polarized antennas and said duplexer means defining a pair of independent, parallel signal channels for each direction of communication cooperating to provide reliable and uninterrupted service in event of failure in one of said signal channels, the polarized antennas disposed at at least one end of said signal channels being spaced relative to each other and said recivers each include a delay means therein to cause phase coincidence in the output signals of the paired receivers coupled to their associated common output means.

4. In a communication system providing reliable and uninterrupted service, a communication terminal comprising a pair of full-time operating transmitters simultaneously transmitting the same intelligence at a first carrier frequency, a common input means for said transmitters, a pair of full-time operating receivers simultaneously responsive to a second carrier frequency, a common output means for said receivers, a first and a second duplexer, means coupling the output of one of said transmitters to the first of said duplexers, means coupling the output of the other of said transmitters to the second of said duplexers, means coupling the first of said duplexers to one of said receivers, means coupling the second of said duplexers to the other of said receivers, and means coupled to each of said duplexers to establish a pair of independent, parallel two-way communication channels.

5. In a communication system providing reliable and uninterrupted service, a communication terminal comprising a pair of full-time operating transmitters simultaneously transmitting the same intelligence at a first carrier frequency and each including an independently self-sustaining local oscillator and a signal fault detector, a common input means for each of said transmitters, a first alarm circuit, a pair of full-time operating receivers simultaneously responsive to a second carrier frequency and each including an automatic gain control circuit and a signal fault detector, a common output means for each of said receivers, a horizontally polarized antenna, a second alarm circuit, a duplexer coupling one transmitter and one receiver to said horizontally polarized antenna to respectively transmit and receive horizontally polarized propagation energy of said first and second carrier frequency, a vertically polarized antenna, a duplexer coupling the other transmitter and the other receiver to said vertically polarized antenna to respectively transmit and receive vertically polarized propagation energy of said first and second carrier frequency, said polarized antennas defining a pair of independent, parallel signal channels, means interconnecting the local oscillator of each of said transmitters to render the carrier frequency output of each of said transmitters identical, means coupling the output of the fault detecting means of each of said transmitters to said first alarm circuit to provide an indication of signal failure in either or both of said transmitters, means interconnecting the automatic gain control circuit of each of said receivers in parallel to provide substantially identical signal level outputs from each of said receivers, and means coupling the output of the fault detecting means of each of said receivers to said second alarm circuit to provide an indication of signal failure in either or both of said receivers.

6. A communication system providing reliable and uninterrupted service comprising a source of intelligence, a pair of full-time operating transmitters each having a carier signal of the same frequency, means coupling said source to each of said transmitters to simultaneously modulate each of said carrier signals with said intelligence, a pair of full-time operating receivers, means to establish a first signal wave path between one of said transmitters and one of said receivers, means to establish a second signal wave path between the other of said transmitters and the other of said receivers, said transmitters exciting said first and second paths simultaneously and inphase with said modulated carrier signals, and an output means coupled to each of said receivers to provide an output signal having a given amplitude when the transmitters and the receivers coupled to said paths operate independently of each other and an output signal having a given gain over said given amplitude when the transmitters and receivers coupled to said paths operate simultaneously.

7. A communication system providing reliable and uninterrupted service comprising a source of intelligence, a pair of full-time operating transmitters each having a carrier signal of the same frequency, each of said transmitters including an independently self-sustaining local oscillator, means coupling said source to each of said transmitters to simultaneously modulate each of said carrier signals with said intelligence, a pair of full-time operating receivers, means to establish a first signal wave path between one of said transmitters and one of said receivers, means to establish a second signal wave path between the other of said transmitters and the other of said receivers, said transmitters exciting said first and second paths simultaneously and inphase with said modulated carrier signals, an output means coupled to each of said receivers to provide an output signal having a given amplitude when the transmitters and the receivers coupled to said paths operate independently of each other and an output signal having a given gain over said given amplitude when the transmitters and the receivers coupled to said paths operate simultaneously, and means interconnecting said local oscillators to synchronize the frequency of the local oscillator of said one transmitter with the frequency of the local oscillator of said other transmitter when the transmitters and the receivers coupled to said paths operate simultaneously.

8. A communication system providing reliable and uninterrupted service comprising a source of intelligence, a pair of full-time operating transmitters each having a carrier signal of the same frequency, means coupling said source to each of said transmitters to simultaneously modulate each of said carrier signals with said intelligence, a pair of full-time operating receivers each including an amplifier system and an independent automatic gain control circuit having means to produce a gain control signal and a control signal loop to couple said control signal to said amplifier system to independently control the gain of its associated receiver, means to establish a first signal wave path between one of said transmitters and one of said receivers, means to establish a second signal wave path between the other of said transmitters and the other of said receivers, said transmitters exciting said first and second paths simultaneously and inphase with said modulated carrier signals, an output means coupled to each of said receivers to provide an output signal having a given amplitude when the transmitters and the receivers coupled to said paths operate independently of each other and an output signal having a given gain over said given amplitude when the transmitters and the receivers coupled to said paths operate simultaneously, and means interconnecting said receivers to connect the control signal loop of said one receiver with the control signal loop of said other receivers to provide substantially equal output levels from each of said receivers when the transmitters and the receivers coupled to said paths operate simultaneously.

9. A communication system providing reliable and uninterrupted service comprising a source of intelligence, a pair of full-time operating transmitters each having a carrier signal of the same frequency, each of said transmitters including an independently self-sustaining local oscillator and a fault detector, means coupling said source to each of said transmitters to simultaneously modulate each of said carrier signals with said intelligence, a pair of full-time operating receivers, means to establish a first signal wave path between one of said transmitters and one of said receivers, means to establish a second signal wave path between the other of said transmitters and the other of said receivers, said transmitters exciting said first and second paths simultaneously and inphase with said modulated carrier signals, an output means coupled to each of said receivers to provide an output signal having a given amplitude when the transmitters and the receivers coupled to said paths operate independently of each other and an output signal having a given gain over said given amplitude when the transmitters and the receivers coupled to said paths operate simultaneously, means interconnecting said local oscillators to synchronize the frequency of the local oscillator of said one transmitter with the frequency of the local oscillator of said other transmitter when the transmitters and the receivers coupled to said paths operate simultaneously, and means connected in common to each of said fault detectors to indicate a failure of either or both of said transmitters.

10. A communication system providing reliable and uninterrupted service comprising a source of intelligence, a pair of full-time operating transmitters each having a carrier signal of the same frequency, means coupling said source to each of said transmitters to simultaneously modulate each of said carrier signals with said intelligence, a pair of full-time operating receivers each including an amplifier system, a fault detector, and an independent automatic gain control circuit having means to produce a gain control signal and a control signal loop to couple said control signal to said amplifier system to independently control the gain of its associated receiver, means to establish a first signal wave path between one of said transmitters and one of said receivers, means to establish a second signal wave path between the other of said transmitters and the other of said receivers, said transmitters exciting said first and second paths simultaneously and inphase with said modulated carrier signals, an output means coupled to each of said receivers to provide an output signal having a given amplitude when the transmitters and the receivers coupled to said paths operate independently of each other and an output signal having a given gain over said given amplitude when the transmitters and the receivers coupled to said paths operate simultaneously, means interconnecting said receivers to connect the control signal loop of said one receiver with the control signal loop of said other receiver to provide substantially equal output levels from each of said receivers when the transmitters and the receivers coupled to said paths operate simultaneously, and means connected in common to each of said fault detectors to indicate a failure of either or both of said receivers.

11. A communication system providing reliable and uninterrupted service comprising a source of intelligence, a pair of full-time operating transmitters each having a carrier signal of the same frequency, each of said transmitters including an independently self-sustaining local oscillator, means coupling said source to each of said transmitters to simultaneously modulate each of said carrier signals with said intelligence, a pair of full-time operating receivers each including an amplifier system, and an independent automatic gain control circuit having means to produce a gain control signal and a control signal loop to couple said control signal to said amplifier system to independently control the gain of its associated receiver, means to establish a first signal wave path between one of said transmitters and one of said receivers, means to establish a second signal wave path between the other of said transmitters and the other of said receivers, said transmitters exciting said first and second paths simultaneously and inphase with said modulated carrier signals, an output means coupled to each of said receivers to provide an output signal having a given amplitude when the transmitters and the receivers coupled to said paths operate independently of each other and an output signal having a given gain over said given amplitude when the transmitters and the receivers coupled to said paths operate simultaneously, means interconnecting said local oscillators to synchronize the frequency of the local oscillator of said one transmitter with the frequency of the local oscillator of said other transmitter when the transmitters and receivers coupled to said paths operate simultaneously, and means interconnecting said receivers to connect the control signal loop of said one receiver with the control signal loop of said other receiver to provide substantially equal output levels from each of said receivers when the transmitters and the receivers coupled to said paths operate simultaneously.

12. A communication system providing reliable and uninterrupted service comprising a source of intelligence, a pair of full-time operating transmitters each having a carrier signal of the same frequency, each of said transmitters including an independently self-sustaining local oscillator and a first fault detector, means coupling said source of each of said transmitters to simultaneously modulate each of said carrier signals with said intelligence, a pair of full-time operating receivers each including an amplifier system, a second fault detector and an independent automatic gain control circuit having means to produce a gain control signal and a control signal loop to couple said control signal to said amplifier system to independently control the gain of its associated receiver, means to establish a first signal wave path between one of said transmitters and one of said receivers, means to establish a second signal wave path between the other of said transmitters and the other of said receivers, said transmitters exciting said first and second paths simultaneously and inphase with said modulated carrier signals, an output means coupled to each of said receivers to provide an output signal having a given amplitude when the transmitters and the receivers coupled to said paths operate independently of each other and an output signal having a given gain over said given amplitude when the transmitters and the receivers coupled to said paths operate simultaneously, means interconnecting said local oscillators to synchronize the frequency of the local oscillator of said one transmitter with the frequency of the local oscillator of said other transmitter when the transmitters and the receivers coupled to said paths operate simultaneously, means connected in common to each of said first fault detectors to indicate a failure of either or both of said transmitters, means interconnecting said receivers to connect the control signal loop of said one receiver with the control signal loop of said other receiver to provide substantially equal output levels from each of said receivers when the transmitters and the receivers coupled to said paths operate simultaneously, and means connected in common to each of said second fault detectors to indicate a failure in either or both of said receivers.

13. A communication system providing reliable and uninterrupted service comprising a source of intelligence, a pair of full-time operating transmitters each having a carrier signal of the same frequency, means coupling said source to each of said transmitters to simultaneously modulate each of said carrier signals with said intelligence, a pair of full-time operating receivers, first means coupling one of said transmitters and one of said receivers by energy of a given polarization to establish a first signal wave path, second means coupling the other of said transmitters and the other of said receivers by energy of a polarization orthogonally related to said given polarization to establish a second signal wave path, said transmitters exciting said paths simultaneously and inphase with said modulated carrier signals, and an output means coupled to each of said receivers to provide an output signal having a given amplitude when the transmitters and the receivers coupled to said paths operate independently of each other and an output signal having a given gain of said given amplitude when the transmitters and receivers coupled to said paths operate simultaneously.

14. A space diversity communication system providing reliable and uninterrupted service comprising a source of intelligence, a pair of full-time operating transmitters each having a carrier signal of the same frequency, means coupling said source to each of said transmitters to simultaneously modulate each of said carrier signals with said intelligence, a first pair of orthogonally polarized antennas coupled to respective ones of said transmitters, said transmitters exciting each antenna of said first pair of antennas simultaneously and inphase with said modulated carrier signals, a pair of full-time operating receivers each including means to cause phase coincidence between their respective signals, a second pair of orthogonally polarized antennas coupled to respective ones of said receivers, the antennas of at least one pair of said pairs of antennas being spaced relative to each other, and an output means coupled in common to each of said receivers.

15. In a communication system providing reliable and uninterrupted service, a transmitting station comprising a source of intelligence, a pair of full-time operating transmitters each having a carrier signal of the same frequency, means coupling said source to each of said transmitters to simultaneously modulate each of said carrier signals with said intelligence, means coupled to one of said transmitters to provide a first signal wave path and means coupled to the other of said transmitters to provide a second signal wave path, said transmitters exciting said first and second paths simultaneously and inphase with said modulated carrier signals.

16. In a communication system providing reliable and uninterrupted service, a transmitting station comprising a source of intelligence, a pair of full-time operating transmitters each having a carrier signal of the same frequency, each of said transmitters including an independently self-sustaining local oscillator, means coupling said source to each of said transmitters to simultaneously modulate each of said carrier signals with said intelligence, means coupled to one of said transmitters to provide a first signal wave path, means coupled to the other of said transmitters to provide a second signal wave path, said transmitters exciting said first and second paths simultaneously and inphase with said modulated carrier signals, and means interconnecting said local oscillators to synchronize the frequency of the local oscillator of said one transmitter with the frequency of the local oscillator of said other transmitter when both said transmitters operate simultaneously.

17. In a communication system providing reliable and uninterrupted service, a transmitting station comprising a source of intelligence, a pair of full-time operating transmitters each having a carrier signal of the same frequency, each of said transmitters including an independently self-sustaining local oscillator and a fault detector, means coupling said source to each of said transmitters to simultaneously modulate each of said carrier signals with said intelligence, means coupled to one of said transmitters to provide a first signal wave path, means coupled to the other of said transmitters to provide a second signal wave path, said transmitters exciting said first and second paths simultaneously and inphase with said modulated carrier signals, means interconnecting said local oscillators to synchronize the frequency of the local oscillator of said one transmitter with the frequency of the local oscillator of said other transmitter when both said transmitters operate, and means connected in common to said fault detectors to indicate a failure of either or both of said transmitters.

18. In a communication system providing reliable and uninterrupted service, a receiving station comprising a pair of full-time operating receivers responsive separately to the same intelligence modulated carrier signal, each of said receivers including an amplifier system, and an independent automatic gain control circuit having means to produce a gain control signal and a control signal loop to couple said control signal to said amplifier system to independently control the gain of its associated receiver, and an output means coupled to each of said receivers to provide an output signal having a given amplitude when said receivers operate independently of each other and an output signal having a given gain over said given amplitude when both said receivers operate, and means interconnecting said receivers to connect the control signal loop of said one receiver with the control signal loop of said other receiver to provide substantially equal output levels from each of said receivers when both said receivers operate.

19. In a communication system providing reliable and uninterrupted service, a receiving station comprising a pair of full-time operating receivers responsive separately to the same intelligence modulated carrier signal, each of said receivers including an amplifier system, a fault detector, and an independent automatic gain control circuit having means to produce a gain control signal and a control signal loop to couple said control signal to said amplifier system to independently control the gain of its associated receiver, and an output means coupled to each of said receivers to provide an output signal having a given amplitude when said receivers operate independently of each other and an output signal having a given gain over said given amplitude when both said receivers operate, means interconnecting said receivers to connect the control signal loop of said one receiver with the control signal loop of said other receiver to provide substantially equal output levels from each of said receivers when both receivers operate, and means connected in common to each of said fault detectors to indicate a failure of either or both of said receivers.

References Cited in the file of this patent

UNITED STATES PATENTS

| | | |
|---|---|---|
| 1,853,021 | Alexanderson | Apr. 12, 1932 |
| 2,004,107 | Goldsmith | June 11, 1935 |
| 2,173,902 | Gerth et al. | Sept. 26, 1939 |
| 2,175,270 | Koch | Oct. 10, 1939 |
| 2,210,089 | Loughren | Aug. 6, 1940 |
| 2,253,867 | Peterson | Aug. 26, 1941 |
| 2,272,839 | Hammond | Feb. 10, 1942 |
| 2,369,589 | Maddock | Feb. 13, 1945 |
| 2,533,599 | Marie | Dec. 12, 1950 |
| 2,599,643 | Kell | June 10, 1952 |
| 2,610,292 | Bond et al. | Sept. 9, 1952 |
| 2,699,495 | Magnuski et al. | Jan. 11, 1955 |
| 2,706,286 | Wheeler et al. | Apr. 12, 1955 |
| 2,733,296 | Maggio | Jan. 31, 1956 |
| 2,806,944 | Sheffield et al. | Sept. 17, 1957 |
| 2,901,747 | Sunstein | Aug. 25, 1959 |

FOREIGN PATENTS

| | | |
|---|---|---|
| 123,395 | Australia | Jan. 22, 1947 |